United States Patent
Nakamura et al.

(10) Patent No.: US 9,140,173 B2
(45) Date of Patent: Sep. 22, 2015

(54) EXHAUST APPARATUS FOR MULTI-CYLINDER ENGINE

(71) Applicant: MAZDA MOTOR CORPORATION, Hiroshima (JP)

(72) Inventors: Mitsuo Nakamura, Hiroshima (JP); Mikihito Fujii, Hiroshima (JP); Nobuhiro Soumiyou, Hiroshima (JP); Shunki Okazaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/345,926

(22) PCT Filed: Nov. 6, 2012

(86) PCT No.: PCT/JP2012/007113
§ 371 (c)(1),
(2) Date: Mar. 19, 2014

(87) PCT Pub. No.: WO2013/073132
PCT Pub. Date: May 23, 2013

(65) Prior Publication Data
US 2014/0237991 A1    Aug. 28, 2014

(30) Foreign Application Priority Data
Nov. 14, 2011    (JP) .................................. 2011-248723

(51) Int. Cl.
*F01N 1/00*    (2006.01)
*F01N 13/08*    (2010.01)
(Continued)

(52) U.S. Cl.
CPC ................ *F01N 13/08* (2013.01); *F01N 13/00* (2013.01); *F01N 13/008* (2013.01); *F01N 13/10* (2013.01);
(Continued)

(58) Field of Classification Search
CPC ... F01N 13/10; F01N 13/102; F01N 13/1811; F01N 13/08; F01N 13/14
USPC ............................................ 60/322, 323, 324
See application file for complete search history.

(56) References Cited

U.S. PATENT DOCUMENTS 6,082,103 A  *  7/2000  Sugiura et al. ................... 60/323
7,418,818 B2 *  9/2008  Kato et al. ........................ 60/324
(Continued)

FOREIGN PATENT DOCUMENTS

JP        02-119922 A       9/1990
JP        02-119922 U       9/1990
(Continued)

OTHER PUBLICATIONS

International Search Report; PCT/JP2012/007113; Jan. 22, 2013.

*Primary Examiner* — Thomas Denion
*Assistant Examiner* — Patrick Maines
(74) *Attorney, Agent, or Firm* — Studebaker & Brackett PC

(57) ABSTRACT

An exhaust apparatus for a multi-cylinder engine which is capable of suppressing deterioration in ejector effect with a simple configuration comprises: a plurality of independent exhaust ducts each having an upstream end connected to an exhaust port of one cylinder or exhaust ports of two or more cylinders which are non-successive in terms of exhaust order; and a merged portion configured to allow exhaust gas passing through each of the independent exhaust ducts to flow thereinto and formed to be gradually reduced in diameter toward a downstream side in an exhaust gas flow direction. The independent exhaust ducts are connected to an upstream end of the merged portion in such a manner that downstream ends thereof are bundled together. An O2 sensor is provided in the merged portion or a portion of an exhaust duct line downstream of the merged portion, to partially block an exhaust gas flow passage.

16 Claims, 12 Drawing Sheets

(51) Int. Cl.
*F01N 13/10* (2010.01)
*F02D 41/14* (2006.01)
*F02D 13/02* (2006.01)
*F01N 13/00* (2010.01)
*F02D 35/00* (2006.01)

(52) U.S. Cl.
CPC ............ *F02D 13/0261* (2013.01); *F02D 35/00* (2013.01); *F02D 41/1439* (2013.01); *F02D 41/1454* (2013.01); *Y02T 10/18* (2013.01)

(56) References Cited

U.S. PATENT DOCUMENTS

2006/0053782 A1* 3/2006 Kobayashi et al. ............. 60/302
2006/0064964 A1* 3/2006 Kono et al. ..................... 60/276
2007/0119156 A1* 5/2007 Hill et al. ........................ 60/302
2009/0094978 A1* 4/2009 Yamagata et al. .............. 60/602
2009/0126355 A1* 5/2009 Uchida ............................ 60/323
2013/0306025 A1* 11/2013 Matsumoto et al. .......... 123/345

FOREIGN PATENT DOCUMENTS

| JP | 04-036023 A | | 2/1992 | |
|---|---|---|---|---|
| JP | 2003083061 A | * | 3/2003 | ................ F01N 7/10 |
| JP | 2004-211639 A | | 7/2004 | |
| JP | 2007-170306 A | | 7/2007 | |
| JP | 2009-097335 A | | 5/2009 | |
| JP | 2009-197758 A | | 9/2009 | |
| WO | 2007/086277 A1 | | 8/2007 | |

\* cited by examiner

EXHAUST APPARATUS FOR MULTI-CYLINDER ENGINE

TECHNICAL FIELD

The present invention relates to an exhaust apparatus for a multi-cylinder engine mountable on an automotive vehicle or the like.

BACKGROUND ART

Heretofore, in regard to a multi-cylinder engine mountable on an automotive vehicle or the like, developments of an exhaust apparatus intended to improve torque performance have been promoted.

For example, the following Patent Document 1 discloses a technique in which exhaust ducts of cylinders which are non-successive in terms of exhaust order are bundled and merged together as a tapered exhaust pipe, and an ejector effect is imparted to a throat of the merged portion to thereby prevent exhaust interference between the cylinders.

Patent Document 1: Japanese Patent Application Laid-open No. H04-036023

SUMMARY OF THE INVENTION

With a view to achieving an improvement of torque performance in a multi-cylinder engine, suppression of deterioration in the ejector effect is one critical factor.

It is therefore an object of the present invention to provide an exhaust apparatus for a multi-cylinder engine capable of suppressing deterioration in the ejector effect with a simple configuration.

In order to solve the above problem, the present invention provides an exhaust apparatus for a multi-cylinder engine having a plurality of cylinders each provided with an intake port, an exhaust port, an intake valve capable of opening and closing the intake port, and an exhaust valve capable of opening and closing the exhaust port. The exhaust apparatus comprises: a plurality of independent exhaust ducts each having an upstream end connected to the exhaust port of one of the cylinders or the exhaust ports of two or more of the cylinders which are non-successive in terms of exhaust order; and a merged portion configured to allow exhaust gas passing through each of the independent exhaust ducts to flow thereinto and formed to be gradually reduced in diameter toward a downstream side in an exhaust gas flow direction, wherein: the independent exhaust ducts are connected to an upstream end of the merged portion in such a manner that downstream ends thereof are bundled together; and the merged portion or a portion of an exhaust duct line downstream of the merged portion is provided with an obstacle member for partially blocking an exhaust gas flow passage.

These and other objects, features, and advantages of the present invention will become apparent upon reading the following detailed description along with the accompanying drawings.

MODE FOR CARRYING OUT THE INVENTION

(1) Overall Configuration

Figure 1:
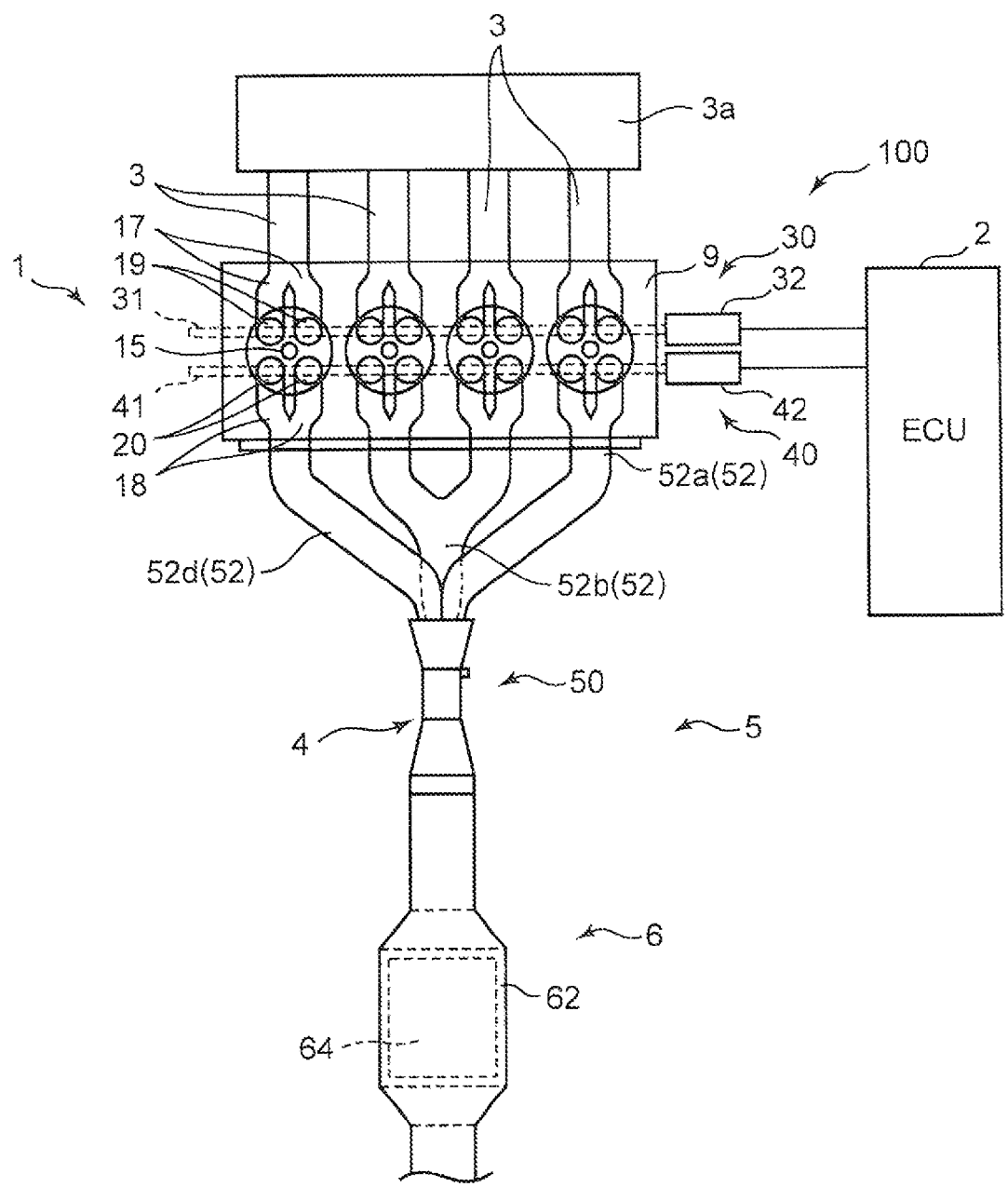
FIG. 1 is a schematic configuration diagram of an exhaust apparatus for a multi-cylinder engine according to one embodiment of the present invention.
Figure 2:
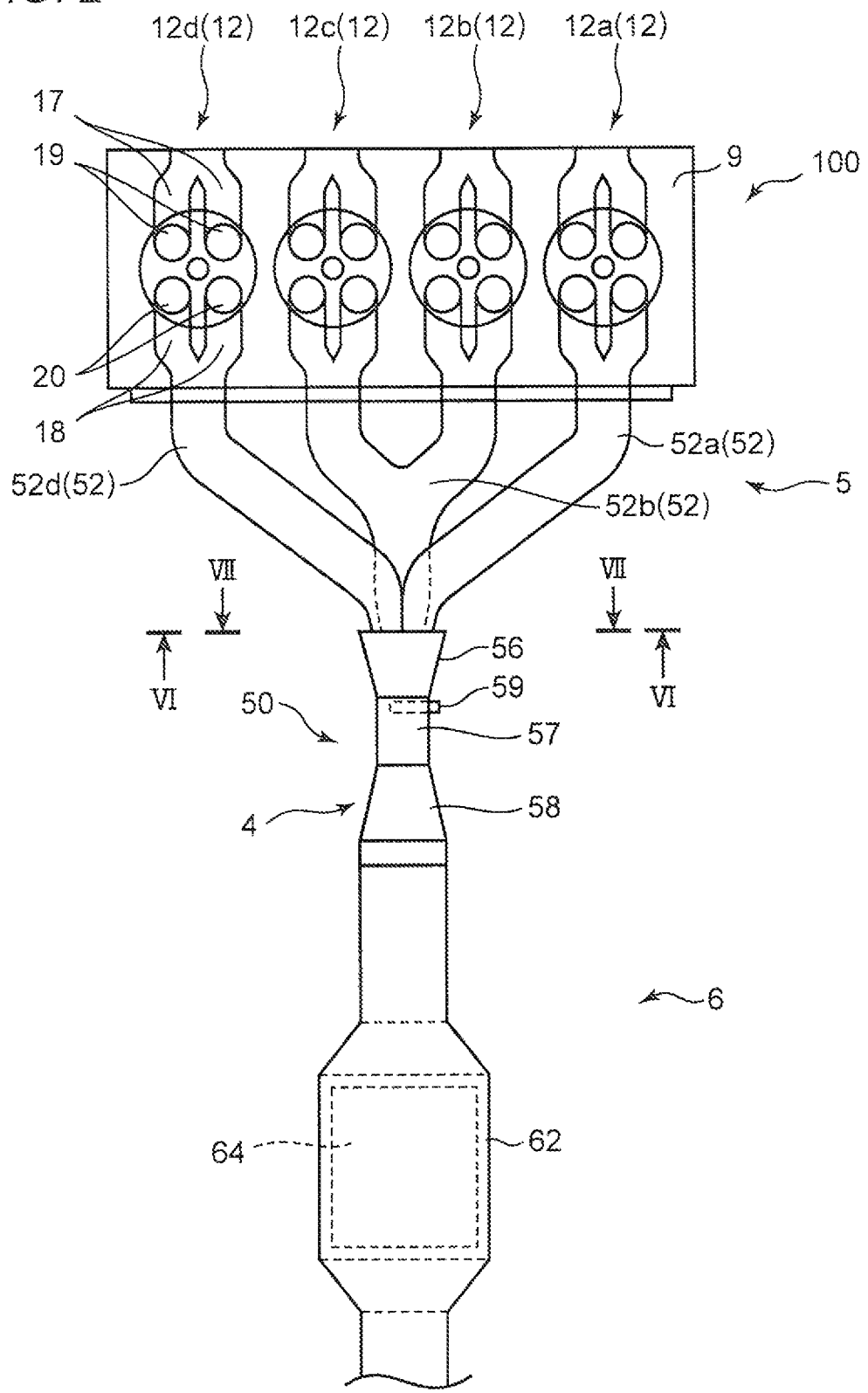
FIG. 2 is a fragmentary enlarged view of FIG. 1.
Figure 3:
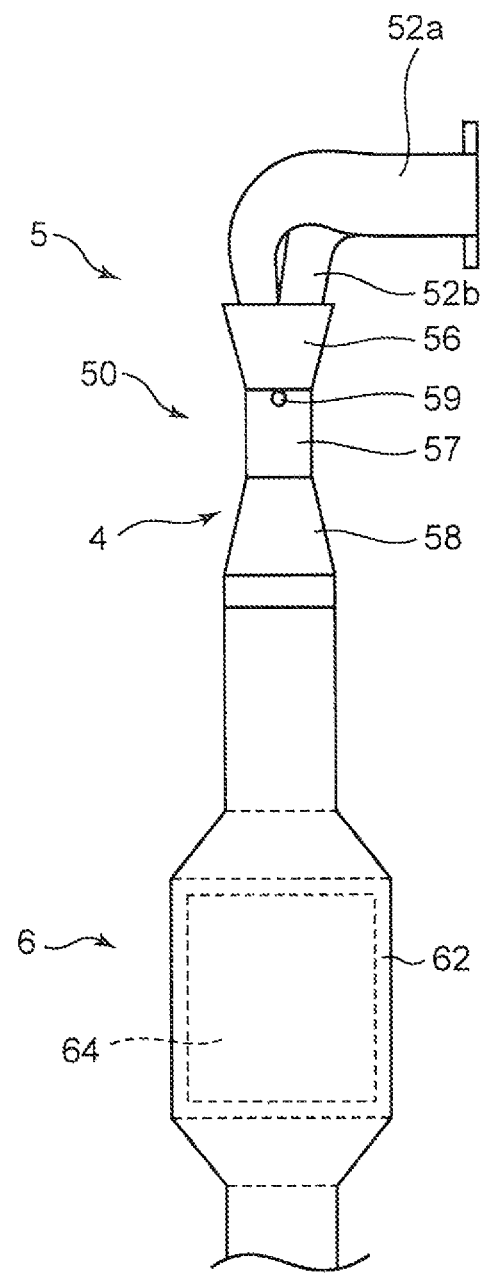
FIG. 3 is a fragmentary side view of FIG. 2.

FIG. 1 is a schematic configuration diagram of an exhaust apparatus for a multi-cylinder engine 100 according to one embodiment of the present invention, FIG. 2 is a fragmentary enlarged view of FIG. 1, and FIG. 3 is a fragmentary side view of FIG. 2.

The exhaust apparatus for a multi-cylinder engine 100 according to this embodiment comprises: an engine body 1 having a cylinder head 9 and a cylinder block (not illustrated); an ECU (Engine Control Unit) 2 for engine control; an exhaust manifold 5 connected to the engine body 1, and a catalytic device 6 connected to the exhaust manifold 5.

The engine body 1 is an in-line four-cylinder engine. A plurality of (in the illustrated embodiment, four) cylinders 12 each having a piston fittingly inserted therein are formed inside the engine body 1 in such a manner that they are arranged side-by-side in line. Specifically, a first cylinder 12$a$, a second cylinder 12$b$, a third cylinder 12$c$ and a fourth cylinder 12$d$ are formed in order from a right side in FIGS. 1 and 2. The cylinder head 9 is provided with four spark plugs 15 each installed in a respective one of the cylinders 12 in such a manner as to be exposed to a combustion chamber defined above the piston. Further, a fuel injection valve (not illustrated) for directly injecting fuel into the combustion chamber is provided for each of the cylinders 12.

Figure 4:
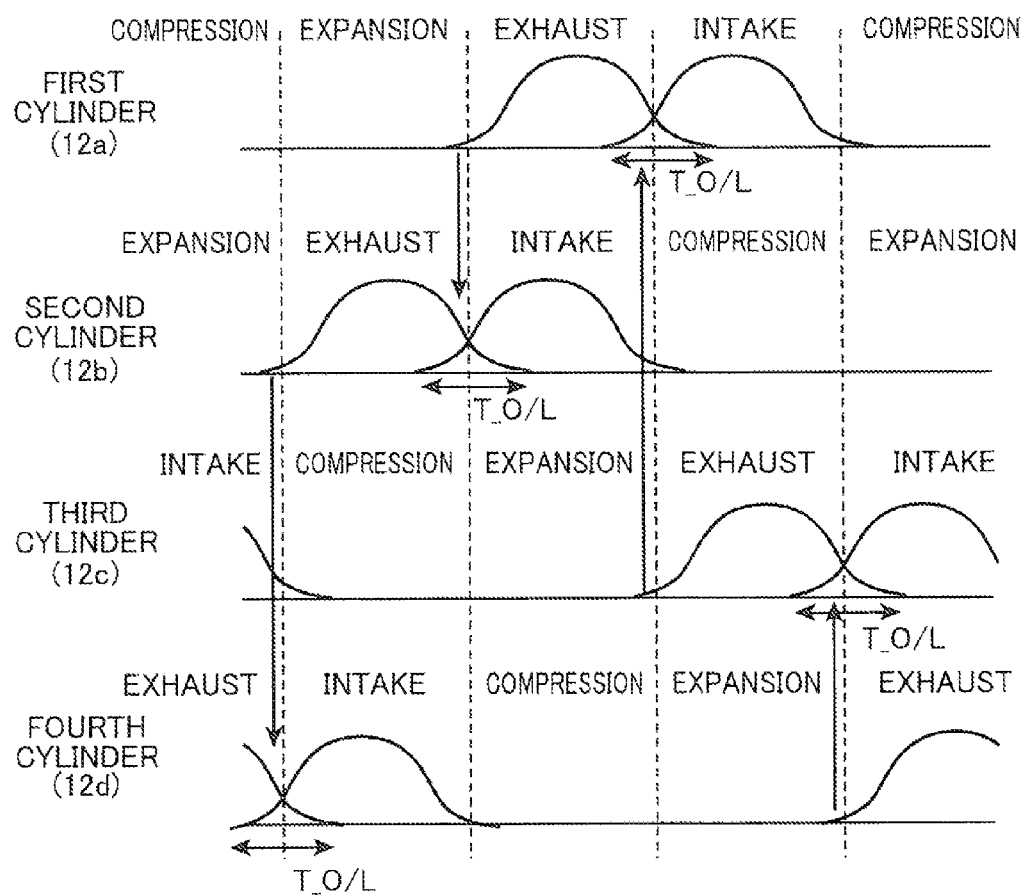
FIG. 4 is an explanatory diagram illustrating that an exhaust valve opening period and an intake valve opening period in each cylinder of the engine overlap each other during a given overlap period.

The engine body 1 has a four-stroke engine configuration. As shown in FIG. 4, in the cylinders 12$a$ to 12$d$, firings using the spark plugs 15 are performed at timings sequential shifted by 180 degrees CA (Crank Angle) and therefore four strokes consisting of an intake stroke, a compression stroke, an expansion stroke and an exhaust stroke are performed at timings sequential shifted by 180 degrees CA. In this embodiment, firing is performed in order of the first cylinder 12a→the third cylinder 12c→the fourth cylinder 12d→the second cylinder 12b, and the four strokes are executed in this order.

In the cylinder head 9, two intake ports 17 and two exhaust ports 18 each opened toward the combustion chamber are provided for each of the cylinders 12. The intake ports 17 are provided as a means to introduce intake air into each of the cylinders 12. The exhaust ports 18 are provided as a means to discharge exhaust gas from each of the cylinders 12. Each of the intake ports 17 is provided with an intake valve 19 for opening and closing the intake port 17 to allow and interrupt fluid communication between the intake port 17 and an inside of the cylinder 12. Each of the exhaust ports 18 is provided with an exhaust valve 20 for opening and closing the exhaust port 18 to allow and interrupt fluid communication between the exhaust port 18 and an inside of the cylinder 12. The intake valve 19 is driven by an intake-valve driving mechanism 30 to thereby open and close the intake port 17 at a given valve timing. The exhaust valve 20 is driven by an exhaust-valve driving mechanism 40 to thereby open and close the exhaust port 18 at a given valve timing.

The intake-valve driving mechanism 30 comprises an intake camshaft 31 coupled to the eight intake valves 19, and an intake VVT 32. The intake camshaft 31 is coupled to a crankshaft (not shown) via a power transmission mechanism such as a well-known chain and sprocket mechanism, and configured to be rotated according to rotation of the crankshaft to thereby drivingly open and close the intake valves 19. The intake VVT 32 is provided as a means to change a valve timing of each of the intake valves 19.

The intake VVT 32 comprises a given driven shaft arranged in coaxial relation to the intake camshaft 31 and configured to be directly driven by the crankshaft, wherein it is configured to change a phase difference between the driven shaft and the intake camshaft 31. Therefore, the phase difference between the crankshaft and the intake camshaft 31 is changed, so that the valve timing of each of the intake valves 19 is changed.

Examples of a specific configuration of the intake VVT 32 include a hydraulically actuated mechanism and a magnetically actuated mechanism. The hydraulically actuated mechanism comprises a plurality of circumferentially-arranged liquid chambers provided between the driven shaft and the intake camshaft 31, wherein it is configured to adjust a pressure difference between respective ones of the liquid chambers to thereby change the phase difference between the driven shaft and the intake camshaft 31. The magnetically actuated mechanism comprises a solenoid provided between the driven shaft and the intake camshaft 31, wherein it is configured to adjust electricity to be applied to the solenoid, to thereby change the phase difference between the driven shaft and the intake camshaft 31. The intake VVT 32 is operable, based on a target valve timing of each of the intake valves 19 calculated by the ECU 2, to change the phase difference. Thus, according to the rotation of the crankshaft and under the changed phase difference, the intake camshaft 31 is rotated to drivingly open and close each of the intake valves 19 at the target timing.

The intake ports 17 in each of the cylinders 12 are connected to a downstream end of a respective one of four intake ducts 3. Each of the intake ducts 3 has an upstream end connected to a surge tank 3a.

The exhaust-valve driving mechanism 40 has a similar structure to that of the intake-valve driving mechanism 30. That is, the exhaust-valve driving mechanism 40 comprises an exhaust camshaft 41 coupled to the eight exhaust valves 20 and the crankshaft, and an exhaust VVT 42 for changing a phase difference between the exhaust camshaft 41 and the crankshaft to thereby change a valve timing of each of the exhaust valves 20. The exhaust VVT 42 is operable, based on a target valve timing of each of the exhaust valves 20 calculated by the ECU 2, to change the phase difference. Thus, according to the rotation of the crankshaft and under the changed phase difference, the exhaust camshaft 41 is rotated to drivingly open and close each of the exhaust valves 20 at the target valve timing.

In this embodiment, each of the intake VVT 32 and the exhaust VVT 42 is configured to change a valve opening timing and a valve closing timing of a respective one of the intake valve 19 and the exhaust valve 20, while maintaining a valve opening period and a valve lift amount, i.e., a valve profile, of the respective one of the intake valve 19 and the exhaust valve 20.

Figure 5:
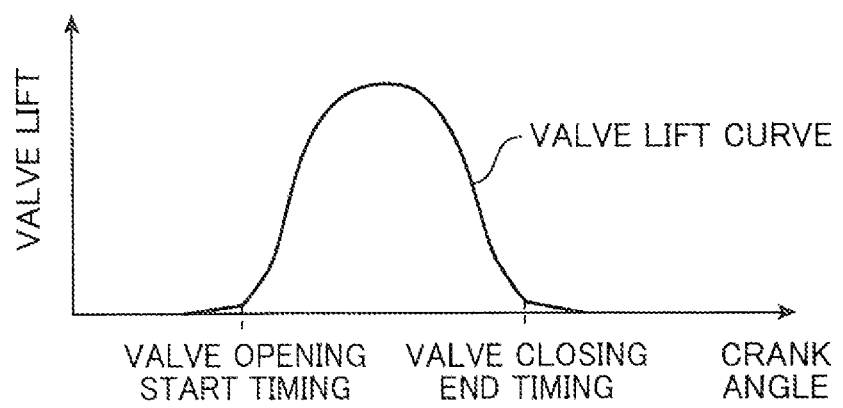
FIG. 5 is an explanatory diagram of the intake valve or exhaust valve opening period.

In this embodiment, as illustrated in FIG. 5, the valve opening timing and the valve closing timing of each of the intake and exhaust valves 19, 20 mean, respectively, a valve opening start timing and a valve closing end timing, on an assumption that an interval of a valve lift curve, except for zones around valve opening and closing points where the valve lift curve has a gentle slope (ramp zones), is defined as a valve opening period. For example, when the ramp zone has a height of 0.4 mm, a timing when the valve lift amount is increased to 0.4 mm and a timing when the valve lift amount is reduced to 0.4 mm are defined as the valve opening timing and the valve closing timing, respectively.

(2) Configuration of Exhaust System

The exhaust manifold 5 comprises three independent exhaust ducts 52, and a mixing duct 50 connected to respective downstream ends of the independent exhaust ducts 52 to allow exhaust gas passing through the independent exhaust ducts 52 to flow thereinto. The mixing duct 50 comprises on an axis thereof: a merged portion 56 having a flow passage area which decreases toward a downstream side; a straight portion 57 extending toward the downstream side while maintaining a flow passage area at a downstream end of the merged portion 56 (the smallest flow passage area of the mixing duct 50); and a diffuser portion 58 having a flow passage area which increases toward the downstream side, in this order from an upstream side.

Each of the independent exhaust ducts 52 has an upstream end connected to the exhaust ports 18 of the cylinders 12. Specifically, an upstream end of one independent exhaust duct (first independent exhaust duct) 52a is connected to the exhaust ports 18 of the first cylinder 12a among the four cylinders 12, and an upstream end of another one independent exhaust duct (third independent exhaust duct) 52d is connected to the exhaust ports 18 of the fourth cylinder 12d. On the other hand, regarding the second and third cylinders 12b, 12c whose exhaust strokes are not adjacent to each other, i.e., which are non-successive in terms of exhaust order, an upstream end of a single common independent exhaust duct (second independent exhaust duct) 52b is connected to the exhaust ports 18 thereof, in view of structural simplification. More specifically, in the second independent exhaust duct 52b having an upstream end connected to the exhaust ports 18 of the second cylinder 12b and the exhaust ports 18 of the third cylinder 12c, an upstream portion thereof is branched into two ducts, wherein an upstream end of one of the branched ducts is connected to the exhaust ports 18 of the second cylinder 12b, and an upstream end of the other duct is connected to the exhaust ports 18 of the third cylinder 12c.

In this embodiment, the second independent exhaust duct 52b corresponding to the second cylinder 12b and the third cylinder 12c extends toward the merged portion 56 of the mixing duct 50, in a position opposed to a region between the second cylinder 12b and the third cylinder 12c, i.e., a central region of the engine body 1 in a cylinder row direction. On the other hand, the first independent exhaust duct 52a corresponding to the first cylinder 12a, and the third independent exhaust duct 52d corresponding to the fourth cylinder 12d, extend from respective positions opposed to the first cylinder 12a and the fourth cylinder 12d toward the merged portion 56 of the mixing duct 50, while curving.

The first, second and third independent exhaust ducts 52a, 52b, 52d are independent of each other. Thus, exhaust gas discharged from the first cylinder 12a, exhaust gas discharged from the second cylinder 12b or the third cylinder 12c and exhaust gas discharged from the fourth cylinder 12d are discharged toward the downstream side through the independent exhaust ducts 52a, 52b, 52d, independently of each other. The exhaust gas passing through the independent exhaust ducts 52a, 52b, 52d flows into the merged portion 56 of the mixing duct 50.

The independent exhaust ducts 52 and the merged portion 56 have shapes capable of inducing the following phenomenon: when exhaust gas expelled from one of the independent exhaust ducts 52 at high speeds flows into the merged portion 56 at high speeds, a negative pressure is generated around the high-speed exhaust gas stream, and the generated negative pressure in the mixing duct 50 is applied to the adjacent, remaining independent exhaust ducts 52 and the exhaust ports 18 of the remaining independent exhaust ducts 52, so that exhaust gas in the exhaust ports 18 are sucked toward the downstream side by an action of the negative pressure (i.e., shapes capable of obtaining an ejector effect).

More specifically, the merged portion 56 is formed in a shape having a flow passage area which decreases toward the downstream side, so as to allow exhaust gas discharged from each of the independent exhaust ducts 52 to flow toward the downstream side while being maintained at high speeds, and prevent backflow of the exhaust gas from the downstream side. In this embodiment, with a view to allowing a speed of exhaust gas to be maintained at a high level, the flow passage area at the downstream end of the merged portion 56 is set to a value less than a total flow passage area at downstream ends of the independent exhaust ducts 52. In this embodiment, the merged portion 56 has an inversed circular truncated cone shape (funnel-like shape) having a diameter which decreases toward the downstream side.

As mentioned above, in a region of the merged portion 56 and the straight portion 57 in the mixing duct 50, a flow passage area on a downstream side is less than that on an upstreammost side. Therefore, exhaust gas passes through the merged portion 56 and the straight portion 57 at high speeds. During this passing, the exhaust gas is reduced in pressure and temperature. Thus, in the region of the merged portion 56 and the straight portion 57, heat radiation from exhaust gas to the outside is suppressed at a low level. After passing through the straight portion 57, the exhaust gas flows into the diffuser portion 58 having a flow passage area which increases toward the downstream side. Therefore, the pressure and temperature of the exhaust gas are returned to their original state. Then, after passing through the diffuser portion 58, the exhaust gas is discharged to the catalytic device 6 downstream thereof, while being maintained at high temperatures.

Figure 6:
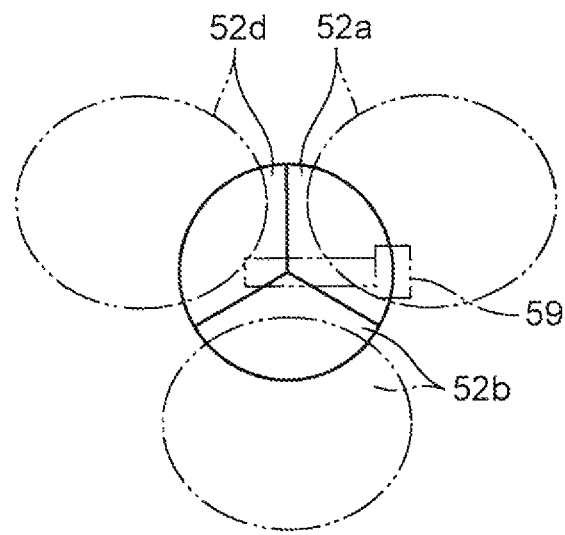
FIG. 6 is a sectional view taken along the line VI-VI in FIG. 2.

In addition, a downstream portion of each of the independent exhaust ducts 52 is formed in a shape having a flow passage area which decreases toward the downstream side, so as to allow exhaust gas to be expelled from the independent exhaust duct 52 into the merged portion 56 at high speeds. In this embodiment, as illustrated in FIG. 6, each of the independent exhaust ducts 52a, 52b, 52d has an upstream portion (indicated by the two-dot chain line) formed in an approximately elliptical cross-sectional shape, and a downstream end (indicated by the solid line) formed in a sectoral cross-sectional shape. Further, a cross-sectional area, i.e., a flow passage area, is reduced in a direction from the upstream portion to the downstream end. Specifically, a flow passage area at the downstream end of each of the independent exhaust ducts 52a, 52b, 52d is reduced to about ⅓ of a flow passage area at the upstream portion.

Figure 7:
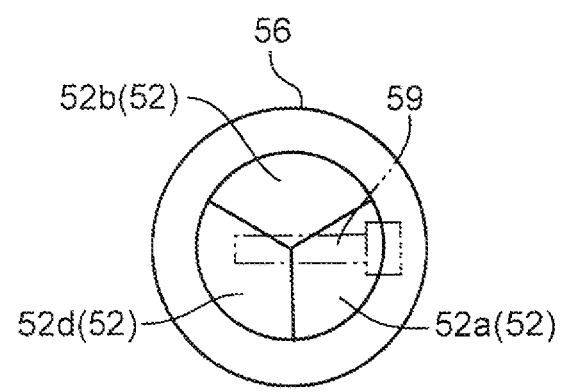
FIG. 7 is a sectional view taken along the line VII-VII in FIG. 2.

As illustrated in FIG. 7, the independent exhaust ducts 52a, 52b, 52d are merged in such a manner that the sector-shaped downstream ends are adjoined to each other to form an approximately circular cross-sectional shape as a whole, and connected to an upstream end of the merged portion 56 (see FIGS. 1 and 2). That is, in terms of a cross-sectional shape in a direction perpendicular to an axis of the mixing duct 50, the downstream ends of the independent exhaust ducts 52 are formed in the same sector shape (see FIGS. 6 and 7). Then, the downstream ends of the independent exhaust ducts 52 are bundled together to merge the sectors so as to form an approximately circular shape, and connected to the upstream end of the merged portion 56 of the mixing duct 50.

In this embodiment, as illustrated in FIG. 4, the valve timing is set such that, at least in a low-speed and high-load engine operating range, the valve opening period of each of the exhaust valves 20 and the valve opening period of each of the intake valves 19 in each of the cylinders 12 overlap each other for a given overlap period T_O/L across top dead center (TDC) of intake stroke, and the exhaust valves 20 of one of the cylinders 12, 12 which are successive in terms of exhaust order (following cylinder) 12 is opened during the overlap period T_O/L in the other cylinder (preceding cylinder) 12.

More specifically, as illustrated in FIG. 4, the valve timing is set as follows. The exhaust valves 20 of the third cylinder 12c is opened during the overlap period T_O/L between the exhaust valves 20 and the intake valves 19 in the first cylinder 12a, the exhaust valves 20 of the fourth cylinder 12d is opened during the overlap period T_O/L between the exhaust valves 20 and the intake valves 19 in the third cylinder 12c, the exhaust valves 20 of the second cylinder 12b is opened during the overlap period T_O/L between the exhaust valves 20 and the intake valves 19 in the fourth cylinder 12d, and the exhaust valves 20 of the first cylinder 12a is opened during the overlap period T_O/L between the exhaust valves 20 and the intake valves 19 in the second cylinder 12b.

That is, the intake-valve driving mechanism 30 and the exhaust-valve driving mechanism 40 are operable, in response to receiving control signals from the ECU 2, to drive the intake valves 19 and the exhaust valves 20 in each of the cylinders 12 in such a manner that, at least in a low-speed and high-load engine operating range, the valve opening period of each of the exhaust valves 20 and the valve opening period of each of the intake valves 19 in each of the cylinders 12 overlap each other for a given overlap period T_O/L, and each of the exhaust valves 20 of a following one 12 of the cylinders 12, 12 which are successive in terms of exhaust order is opened during the overlap period T_O/L in the other, preceding, cylinder 12.

In this way, when the exhaust valves 20 of the cylinder 12 which is in an exhaust stroke are opened, and blowdown gas from the cylinder 12 being in the exhaust stroke is expelled into the merged portion 56 at high speeds via a corresponding one of the independent exhaust ducts 52, a negative pressure is generated, by the ejector effect, in the exhaust ports 18 of the preceding cylinder 12 which is in a certain phase of an intake stroke corresponding to the overlap period T_O/L. Thus, the ejector effect is exerted on not only the exhaust ports 18 of the preceding cylinder 12 being in the certain phase of the intake stroke corresponding to the overlap period T_O/L but also the intake ports 17 of the preceding cylinder 12, so that scavenging in the preceding cylinder 12 being in the certain phase of the intake stroke corresponding to the overlap period T_O/L is further promoted.

Returning to FIGS. 1, 2 and 3, the catalytic device 6 is provided as a means to purify exhaust gas discharged from the engine body 1. The catalytic device 6 comprises a catalyst body 64, and a casing 62 housing the catalyst body 64. The casing 62 has an approximately circular cylindrical shape extending parallel to an exhaust gas flow direction. The catalyst body 64 is capable of purifying harmful components contained in exhaust gas. For example, it comprises a three-way catalyst and brings out a three-way catalyst function in an atmosphere at a theoretical air/fuel ratio.

The catalyst body 64 is housed in a diametrally-expanded portion formed in a central region of the casing 62 in the exhaust gas flow direction. The casing 62 has an upstream end (upstream duct portion of the casing 62) defining therein a given space. The diffuser portion 58 of the mixing duct 50 has a downstream end connected to the upstream duct portion of the casing 62. Thus, exhaust gas discharged from the diffuser portion 58 flows into the upstream duct portion, and then moves toward the catalyst body 64.

As mentioned above, high-temperature exhaust gas is discharged from the diffuser portion 58 of the mixing duct 50 into the catalytic device 6. Further, the catalytic device 6 is directly connected to the mixing duct 50. Therefore, relatively high-temperature exhaust gas flows into the catalytic device 6. This allows the catalyst body 64 to be quickly activated, and allows an activated state of the catalyst body 64 to be reliably maintained.

In this embodiment, including the independent exhaust ducts 52, the mixing duct 50, the casing 62 of the catalytic device 6, etc., all of such ducts of the exhaust system for allowing exhaust gas discharged from the cylinders 12 to flow therethrough is referred to collectively as an exhaust duct line, and designated by reference code 4 in FIGS.

(3) Features of Embodiment

Figure 8:
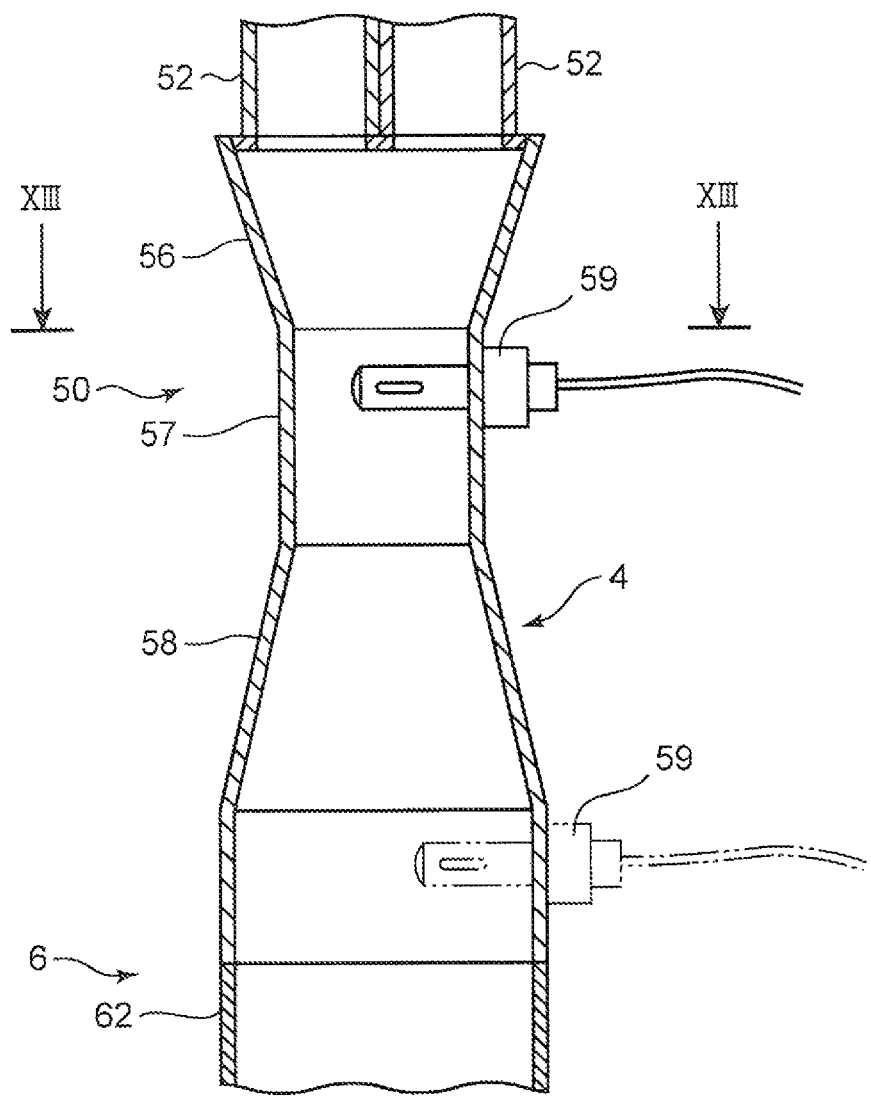
FIG. 8 is a longitudinal sectional view of a mixing duct and its surrounding area in the case where an $O_2$ sensor is provided in a straight portion of the mixing duct, i.e., an exhaust duct downstream of a merged portion of the mixing duct.

As illustrated in FIG. 8, an $O_2$ sensor 59 is installed in the exhaust duct line 4 at a position downstream of the merged portion 56 of the mixing duct 50. More specifically, the $O_2$ sensor 59 is installed at an upstream end of the straight portion 57 located downstream of the merged portion 56 (additionally see FIGS. 2 and 3). That is, the $O_2$ sensor 59 is installed at a position where the mixing duct 50 has the smallest flow passage area. The $O_2$ sensor 59 comprises a rod-shaped sensor portion disposed to protrude from a duct wall into an internal space, i.e., an exhaust gas flow passage, of the mixing duct 50. Thus, the $O_2$ sensor 59 functions as an obstacle member for partially blocking the exhaust gas flow passage of the mixing duct 50, more specifically, an exhaust gas flow passage of the straight portion 57 (additionally see FIGS. 6 and 7). The following description will be made while terming the $O_2$ sensor 59 as "obstacle member 59".

A reason that, in this embodiment, the obstacle member 59 is installed in the exhaust duct line 4 at a position downstream of the merged portion 56 of the mixing duct 50, to partially block an exhaust gas flow passage.

Figure 9:
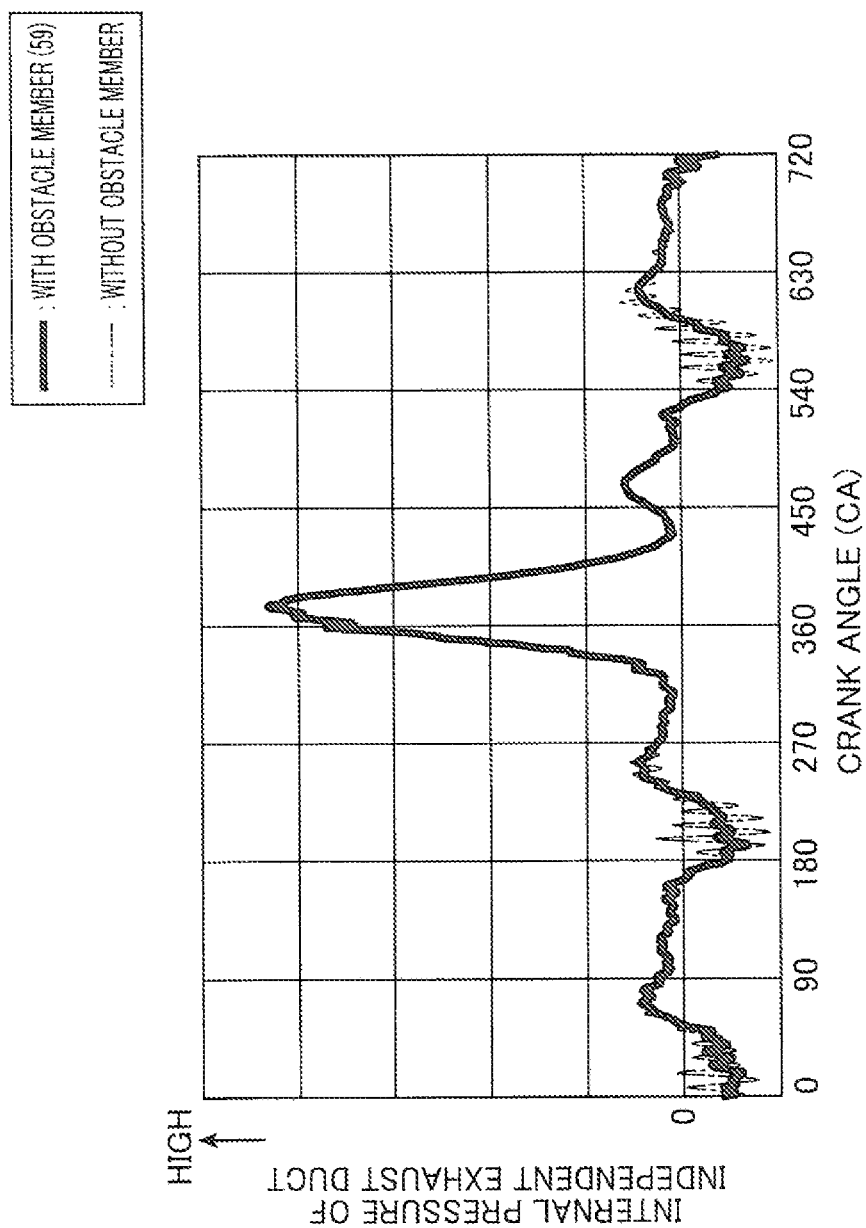
FIG. 9 is an explanatory graph of an effect (suppression of self-excited vibration of an exhaust gas jet flow) of the embodiment.

FIG. 9 is an explanatory graph indicating how an internal pressure of the independent exhaust duct 52a for the first cylinder 12a (the same result is obtained in the independent exhaust duct 52d for the fourth cylinder 12d), among the three independent exhaust ducts 52a, 52b, 52d of the exhaust manifold 5, changes depending on crank angle (CA), in the engine in this embodiment (an engine speed is set at 2500 rpm).

A high pressure around 360 degrees CA is a positive pressure generated inside the independent exhaust duct 52a by blowdown gas from an own-cylinder (first cylinder 12a). On the other hand, a negative pressure around 540 degrees CA is a negative pressure generated inside the independent exhaust duct 52a by an ejector effect based on blowdown gas flowing from the third cylinder 12c into the merged portion 56, a negative pressure around 0 degree CA is a negative pressure generated inside the independent exhaust duct 52a by an ejector effect based on blowdown gas flowing from the fourth cylinder 12d into the merged portion 56, and a negative pressure around 180 degrees CA is a negative pressure generated inside the independent exhaust duct 52a by an ejector effect based on blowdown gas flowing from the second cylinder 12b into the merged portion 56.

As presented in FIG. 9, in the case where the obstacle member to be installed in the exhaust duct line 4 at a position downstream of the merged portion 56 of the mixing duct 50, to partially block an exhaust gas flow passage, is not provided (chain lines), vibration occurs in the internal pressure of the independent exhaust duct 52a for the own-cylinder 12a, when the negative pressure is generated by the ejector effect, i.e., during blowdown from each of the other-cylinders 12b, 12c, 12d. Due to the vibration, the negative pressure inside the mixing duct 50 is weakened, and thereby the ejector effect is deteriorated, so that it becomes difficult to achieve an improvement in torque performance. Moreover, the vibration causes deterioration in NV (Noise and Vibration) performance. In contract, in the case where the obstacle member 59 for partially blocking an exhaust gas flow passage is installed in the exhaust duct line 4 at a position downstream of the merged portion 56 of the mixing duct 50 (solid line), the above vibration is suppressed.

Figure 10:
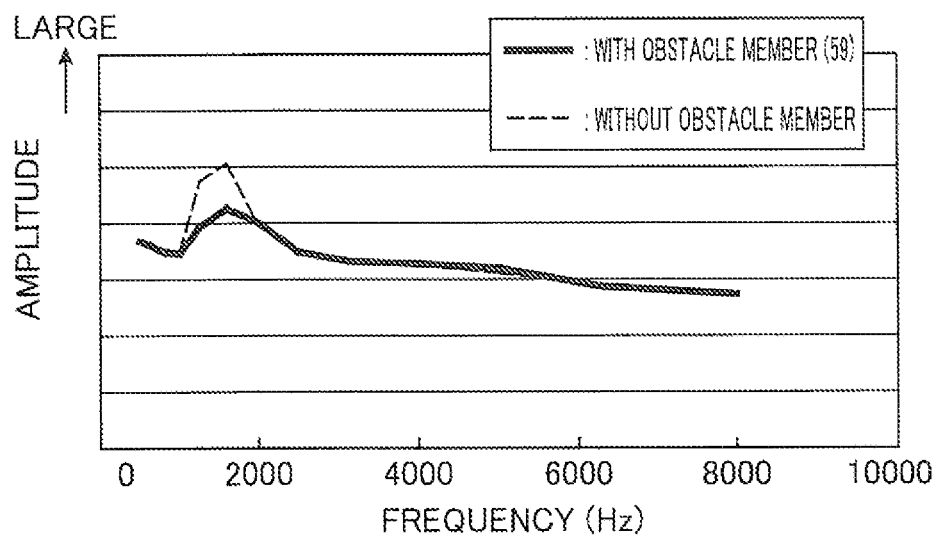
FIG. 10 is an explanatory graph of an effect (suppression of a vibration amplitude in a frequency range of 1000 Hz to 2000 Hz) of the embodiment.

FIG. 10 presents a result obtained by subjecting the vibration occurring in the negative pressure illustrated in FIG. 9 to frequency analysis (an engine speed is set at 2500 rpm). As presented in FIG. 10, within a frequency range of 500 Hz to 8000 Hz, a vibrational amplitude is maximized in the range of 1000 Hz to 2000 Hz (broken line).

Figure 11:
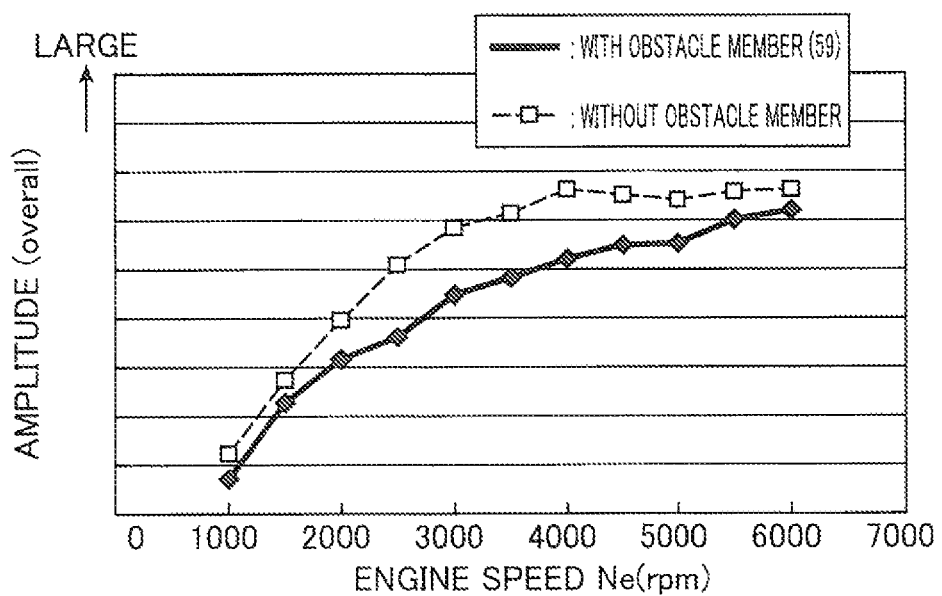
FIG. 11 is an explanatory graph of an effect (suppression of a total value of vibration amplitudes in an engine speed range of 1000 rpm to 6000 rpm) of the embodiment.

FIG. 11 presents a total value of vibrational amplitudes (overall vibrational amplitude) in the frequency range of 1000 Hz to 2000 Hz, under a condition that the engine speed varies in the range of 1000 rpm to 6000 rpm. As presented in FIG. 11, in the case where the obstacle member to be installed in the exhaust duct line 4 at a position downstream of the merged portion 56 of the mixing duct 50, to partially block an exhaust gas flow passage, is not provided (broken line), the total value of vibrational amplitudes in the frequency range of 1000 Hz to 2000 Hz is larger than that in the case where the obstacle member is installed (solid line), in the entire engine speed range of 1000 rpm to 6000 rpm.

Although a reason that vibration occurs in the internal pressure of the independent exhaust duct 52 for the own-cylinder during blowdown from the other-cylinder is not exactly clear, it can be estimated, for example, as follows.

FIG. 12 is diagrams obtained by extracting and re-illustrating a part of FIG. 7 described in "Vibration of Primary Flow in Ultrafast Air Ejector" (Matsuo, Mochizuki, Nakamura), Transactions of the Japan Society of Mechanical Engineers, (Series B), Vol. 52, No. 474 (February, 1986), pp 508-513. In FIG. 12, the reference code 256 and the reference code 252b indicate, respectively, a converged portion of a mixing duct (equivalent to the merged portion 56 of the mixing duct 50 in this embodiment), and a nozzle from which compressed air from a compressor is to be expelled (equivalent to the independent exhaust duct 52b for the other-cylinder in this embodiment), and each of the reference codes 252a, 252d indicates a duct adjacent to the nozzle 252b and communicating with an non-illustrated a merging barrel (chamber) (equivalent to the independent exhaust duct 52a or 52d for the own-cylinder in this embodiment).

Figure 12A:
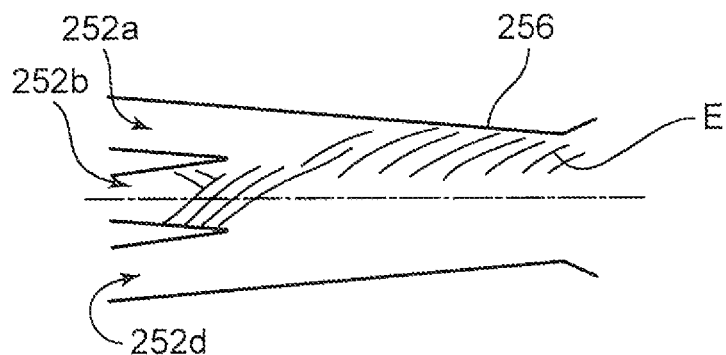
FIGS. 12($a$) to 12($d$) are diagrams for explaining a reason for the occurrence of self-excited vibration of an exhaust gas jet flow, in a step-by-step manner.

When dry air is expelled from the nozzle 252b into the converged portion 256 of the mixing duct at an ultrahigh speed of Mach 3.05, the expelled jet flow E is moved toward one side in the mixing duct due to imbalance of a negative pressure in the mixing duct, and brought into contact with an inner wall surface of the mixing duct (the state of FIG. 12(a)). Then, a region of the jet flow E in contact with the inner wall surface is reduced in speed and thereby weakened in negative pressure, so that the jet flow E is moved to a different location on the inner wall surface of the mixing duct (the state of FIG. 12(c) after the state of FIG. 12(b)). This time, a region of the jet flow E in contact with the different location is reduced in speed and thereby weakened in negative pressure, so that the jet flow E is further moved to a different location on the inner wall surface of the mixing duct (the state of FIG. 12(a) after the state of FIG. 12(d)). As a result of repetition of the above movements, self-excited vibration occurs in the compression air jet flow E expelled from the nozzle 252b. It is assumed that this self-excited vibration appears as vibration of pressure when a negative pressure is generated inside the duct 252a or 252d adjacent to the nozzle 252b (during expelling of compressed air).

Figure 12B:
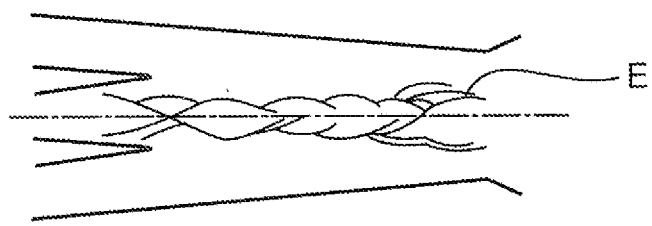
Figure 12C:
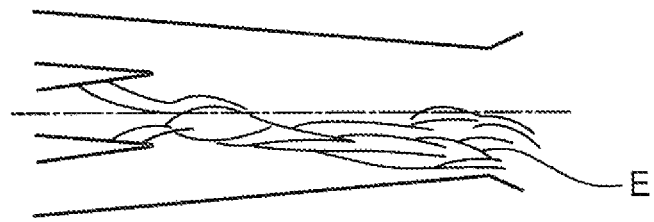
Figure 12D:
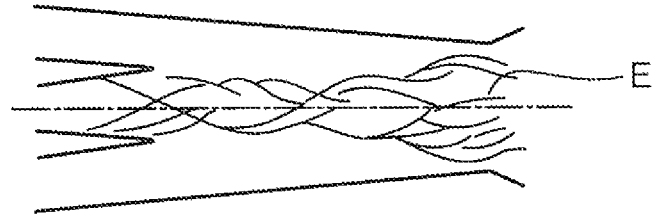

Therefore, it is considered that the self-excited vibration in the compression air jet flow E can be suppressed by, for example, during transition from the state of FIG. 12(a) to the state of FIG. 12(c) via the state of FIG. 12(b), or during transition from the state of FIG. 12(c) to the state of FIG. 12(a) via the state of FIG. 12(d), i.e., when the compression air jet flow E is moved to a different location on the inner wall surface of the mixing duct, hindering the movement.

Thus, in this embodiment, as illustrated in FIG. 8, the obstacle member 59 is installed in the exhaust duct line 4 at a position downstream of the merged portion 56 of the mixing duct 50, to partially block an exhaust gas flow passage. It is believed that the obstacle member 59 has a function of hindering an exhaust gas jet flow expelled from each of the independent exhaust ducts 52 into the merged portion 56 of the mixing duct 50 at high speeds, from being moved to a different location on the inner wall surface of the mixing duct 50, thereby suppressing the self-excited vibration.

It is assumed that, when an exhaust gas jet flow is moved to a different location on the inner wall surface of the mixing duct 50, the exhaust gas jet flow is moved to the different location along the inner wall surface of the mixing duct 50, i.e., while being maintained in contact with the inner wall surface of the mixing duct 50.

FIGS. 9 to 11 also present a function in the case where the obstacle member 59 is installed in the exhaust duct line 4 at a position downstream of the merged portion 56 of the mixing duct 50, to partially block an exhaust gas flow passage (solid line). As shown, in the case where the obstacle member 59 is installed, in FIG. 9, the vibration of internal pressure of the independent exhaust duct 52a for the own-cylinder 12a during blowdown from each of the other-cylinders 12b, 12c, 12d, i.e., the self-excited vibration of the exhaust gas jet flow, is suppressed. In FIG. 10, the vibrational amplitude is reduced in the frequency range of 1000 Hz to 2000 Hz. In FIG. 11, the total value of vibrational amplitudes in the frequency range of 1000 Hz to 2000 Hz is relatively reduced in the engine speed range of 1000 rpm to 6000 rpm.

As a configuration for installing the obstacle member 59 in the exhaust duct line 4 at a position downstream of the merged portion 56, the obstacle member 59 may be installed in the diffuser portion 58 of the mixing duct 50, as indicated by the two-dot chain lines in FIG. 8, depending on situations. Alternatively, although not illustrated, it may be installed in the upstream duct portion of the casing 62 of the catalytic device 6 located downstream of the mixing duct 50. Further, instead of installing the obstacle member 59 in the exhaust duct line 4 at a position downstream of the merged portion 56, the obstacle member 59 may be installed in the merged portion 56.

Figure 13:
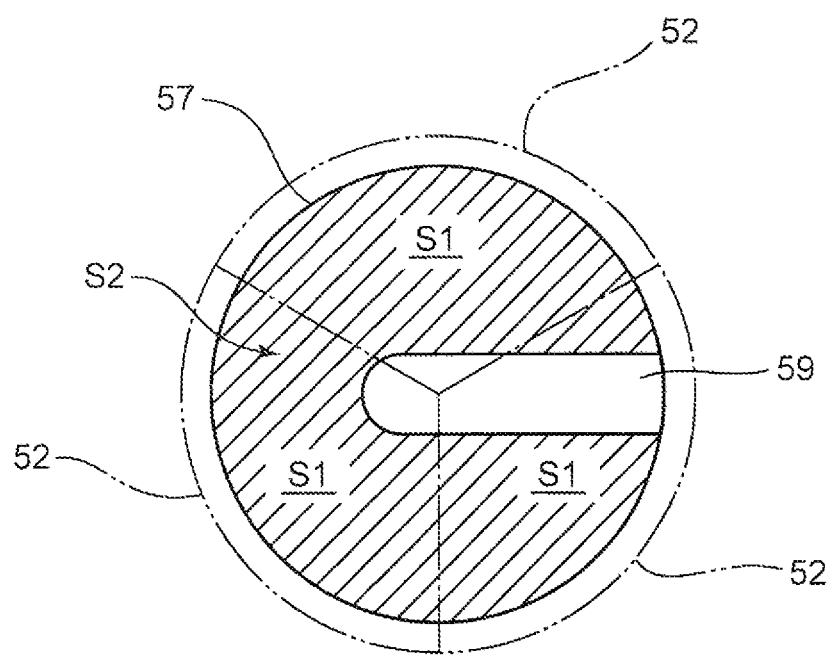
FIG. 13 is a sectional view taken along the line XIII-XIII in FIG. 8, wherein it explains a flow passage area at a downstream end of an independent exhaust duct, and an area obtained by subtracting an area of an exhaust gas flow passage blocked by an obstacle member from the smallest flow passage area.

FIG. 13 is a sectional view taken along the line XIII-XIII in FIG. 8. In FIG. 13, the reference code S1 represents a flow passage area at the downstream end of each of the independent exhaust ducts 52 indicated by the two-dot chain lines. Further, in FIG. 13, a hatched region represents an area (effective flow passage area) obtained by subtracting an area of an exhaust gas flow passage blocked by the obstacle member 59 from the smallest flow passage area of the mixing duct 50. In FIG. 8, the smallest flow passage area is a flow passage area at the downstream end of the merged portion 56 of the mixing duct 50, or the straight portion 57 of the mixing duct 50. In FIG. 8, the obstacle member 59 is installed in the straight portion 57 (i.e., installed at a position having the smallest flow passage area). Thus, in FIG. 13, hatching is given to a region having an area obtained by subtracting an area of an exhaust gas flow passage blocked by the obstacle member 59 (area of the white space) from the flow passage area of the straight portion 57 (area of the circle designated by the reference code 57).

In this embodiment, a/D is set in the range of 0.5 to 0.85, where a represents a diameter of a perfect circle having the same area as the flow passage area S1 at the downstream end of each of the independent exhaust duct 52, and D represents a diameter of a perfect circle having the same area as an area obtained by subtracting an area of an exhaust gas flow passage blocked by the obstacle member 59 from the flow passage area of the straight portion 57, i.e., effective flow passage area (a hatched region in FIG. 13). This provides a good balance between the ejector effect, and an effect of suppressing the self-excited vibration of the exhaust gas jet flow, as described in detail later.

(4) Operation of Embodiment

In the above embodiment, the exhaust apparatus 100 is designed for the multi-cylinder engine having the plurality of cylinders 12a, 12b, 12c, 12d each provided with the intake ports 17, the exhaust ports 18, the intake valves 19 each capable of opening and closing a respective one of the intake ports 17, and the exhaust valves 20 each capable of opening and closing a respective one of the exhaust ports 18. The exhaust apparatus 100 comprises: the plurality of independent exhaust ducts 52a, 52b, 52d each having an upstream end connected to the exhaust ports 18 of one 12a or 12d of the cylinders or the exhaust ports 18 of two or more 12b, 12c of the cylinders which are non-successive in terms of exhaust order; and the mixing duct 50 configured to allow exhaust gas passing through each of the independent exhaust ducts 52a, 52b, 52d to flow thereinto. The independent exhaust ducts 52a, 52b, 52d are connected to an upstream end of the mixing duct 50 in such a manner that downstream ends thereof are bundled together. The mixing duct 50 comprises the merged portion 56 formed to be gradually reduced in diameter toward a downstream side in an exhaust gas flow direction. The merged portion 56 or a portion of the exhaust duct line 4 downstream of the merged portion 56 is provided with the obstacle member 59 for partially blocking an exhaust gas flow passage.

In this embodiment, when exhaust gas passing through each of the independent exhaust ducts 52 flows into the mixing duct 50, a negative pressure is generated inside the mixing duct 50 to thereby obtain an ejector effect of sucking, toward the downstream side, exhaust gas in the remaining independent exhaust ducts 52 and the exhaust ports 18 of the other-cylinders 12 communicating with the remaining independent exhaust ducts 52.

Then, in the above embodiment, the mixing duct 50 comprises the merged portion 56 formed to be gradually reduced in diameter toward the downstream side in the exhaust gas flow direction, i.e., comprises the merged portion 56 having a flow passage area which decreases toward the downstream side, and the merged portion 56 or a portion of the exhaust duct line 4 downstream of the merged portion 56 (the portion may be comprised in the mixing duct 50, or may not be comprised in the mixing duct 50) is provided with the obstacle member 59 for partially blocking an exhaust gas flow passage. Thus, the obstacle member 59 hinders an exhaust gas jet flow expelled from the downstream end of each of the independent exhaust ducts 52 from being moved to a different location on the inner wall surface of the mixing duct 50, thereby suppressing self-excited vibration of the exhaust gas jet flow. If the self-excited vibration occurs in the exhaust gas jet flow, a negative pressure in the mixing duct 50 is weakened, and thereby the ejector effect is deteriorated, so that it becomes difficult to achieve an improvement in torque performance. Thus, by suppressing the self-excited vibration of the exhaust gas jet flow, it becomes possible to suppress the deterioration in the ejector effect, with a simple configuration, and achieve an improvement in torque performance. In addition, among NVH performance, NV performance is improved by suppressing the self-excited vibration of the exhaust gas jet flow.

The exhaust apparatus according to the above embodiment comprises the intake-valve driving mechanism 30 and the exhaust-valve driving mechanism 40 for driving the intake valves 19 and the exhaust valves 20 of each of the cylinders 12 in such a manner that, at least in a low-speed and high-load engine operating range, the valve opening period of each of the exhaust valves 20 and the valve opening period of each of the intake valves 19 in each of the cylinders 12 overlap each other for a given overlap period T_O/L, and each of the exhaust valves 20 of a following one 12 of the cylinders 12, 12 which are successive in terms of exhaust order is opened during the overlap period T_O/L in the other, preceding, cylinder 12.

According to this feature, at least in a low-speed and high-load engine operating range, the overlap period T_O/L is set in which both of the exhaust valves 20 and the intake valves 19 in each of the cylinders 12 are opened, and the exhaust valves 20 of the following cylinder 12 in the cylinders 12, 12 which are successive in terms of exhaust order are opened during the overlap period T_O/L in the other, preceding, cylinder 12. Therefore, the ejector effect is also exerted on the intake ports 17 of the preceding cylinder 12 in the overlap period T_O/L, so that it becomes possible to further promote scavenging in the preceding cylinder 12, and achieve a further improvement in volumetric efficiency ($\eta V$) and thus a further improvement in torque performance.

In the above embodiment, the $O_2$ sensor is used to additionally serve as the obstacle member 59. Thus, by using the $O_2$ sensor to additionally serve as the obstacle member 59, it is able to eliminate a need for providing a special member as the obstacle member 59 to thereby achieve a reduction in the number of components. In addition, the $O_2$ sensor is provided at a position having the smallest flow passage area (in the straight portion 57), so that it becomes possible to evenly detect an oxygen concentration of exhaust gas discharged from the respective cylinders 12. Thus, it is able to accurately detect engine operating states, for example, to accurately control each of the cylinders 12 during execution of AWS.

In the above embodiment, the obstacle member 59 is provided at a position having the smallest flow passage area (straight portion 57), wherein a/D is set in the range of 0.5 to 0.85, where a represents a diameter of a perfect circle having the same area as the flow passage area S1 at the downstream end of each of the independent exhaust ducts 52, and D represents a diameter of a perfect circle having the same area as an area (effective flow passage area) obtained by subtracting an area of an exhaust gas flow passage blocked by the obstacle member 59 from a flow passage area of the straight portion 57 which is the smallest flow passage area.

If the ratio a/D is less than 0.5, the effective flow passage area becomes excessively large. This means that an area of an exhaust gas flow passage blocked by the obstacle member 59 is excessively small, and therefore the effect of suppressing the self-excited vibration of the exhaust gas jet flow is liable to become insufficient. On the other hand, if the ratio a/D is greater than 0.85, the effective flow passage area becomes excessively small. This means that an area of an exhaust gas flow passage blocked by the obstacle member 59 is excessively large. Thus, an exhaust gas jet flow expelled from the downstream end of each of the independent exhaust ducts 52 becomes stagnant, and thereby a negative pressure in the mixing duct 50 is weakened, so that the ejector effect is liable to become insufficient. Considering the above, the ratio a/D is set in the range of 0.5 to 0.85. This provides a good balance between the ejector effect, and the effect of suppressing the self-excited vibration of the exhaust gas jet flow.

The technical features of the above embodiment will be outlined as follows.

The above embodiment discloses an exhaust apparatus for a multi-cylinder engine having a plurality of cylinders each provided with an intake port, an exhaust port, an intake valve capable of opening and closing the intake port, and an exhaust valve capable of opening and closing the exhaust port. The exhaust apparatus comprises: a plurality of independent exhaust ducts each having an upstream end connected to the exhaust port of one of the cylinders or the exhaust ports of two or more of the cylinders which are non-successive in terms of exhaust order; and a merged portion configured to allow exhaust gas passing through each of the independent exhaust ducts to flow thereinto and formed to be gradually reduced in diameter toward a downstream side in an exhaust gas flow direction, wherein the independent exhaust ducts are connected to an upstream end of the merged portion in such a manner that downstream ends thereof are bundled together, and the merged portion or a portion of an exhaust duct line downstream of the merged portion is provided with an obstacle member for partially blocking an exhaust gas flow passage.

In this exhaust apparatus, when exhaust gas passing through each of the independent exhaust ducts flows into the merged portion, a negative pressure is generated inside the merged portion to thereby obtain an ejector effect of sucking, toward the downstream side, exhaust gas in the remaining independent exhaust ducts and the exhaust ports of the other-cylinders communicating with the remaining independent exhaust ducts.

Then, the merged portion is formed to be gradually reduced in diameter toward the downstream side in the exhaust gas flow direction, i.e., the merged portion has a flow passage area which decreases toward the downstream side, and the merged portion or a portion of the exhaust duct line downstream of the merged portion (the portion may be comprised in the mixing duct, or may not be comprised in the mixing duct) is provided with the obstacle member for partially blocking an exhaust gas flow passage. This suppresses self-excited vibration of an exhaust gas jet flow expelled from the downstream end of each of the independent exhaust ducts. It is assumed that the self-excited vibration occurs by repetition of the following movements. When an exhaust gas jet flow is expelled from the downstream end of each of the independent exhaust ducts, the jet flow is moved toward one side in the mixing duct due to imbalance of a negative pressure in the mixing duct comprising the merged portion, and brought into contact with the inner wall surface of the mixing duct. Then, a region of the exhaust gas jet flow in contact with the inner wall surface is reduced in speed and thereby weakened in negative pressure, so that the exhaust gas jet flow is moved to a different location on the inner wall surface of the mixing duct. It is considered that the obstacle member has a function of hindering the exhaust gas jet flow from being moved to a different location on an inner wall surface of the mixing duct, thereby suppressing the self-excited vibration. If the self-excited vibration occurs in the exhaust gas jet flow, a negative pressure in the merged portion (in the mixing duct) is weakened, and thereby the ejector effect is deteriorated. Thus, by suppressing the self-excited vibration of the exhaust gas jet flow, it becomes possible to suppress the deterioration in the ejector effect, with a simple configuration. In addition, among NVH performance, NV (Noise and Vibration) performance is improved by suppressing the self-excited vibration.

The above embodiment discloses that the above exhaust apparatus comprises a valve driving device for driving the intake valve and the exhaust valve of each of the cylinders in such a manner that, at least in a low-speed and high-load engine operating range, a valve opening period of the exhaust valve and a valve opening period of the intake valve in each of the cylinders overlap each other for a given overlap period, and the exhaust valve of a following one of the cylinders which are successive in terms of exhaust order is opened during the overlap period in the other, preceding, cylinder.

According to this feature, at least in a low-speed and high-load engine operating range, the overlap period is set in which both of the exhaust valve and the intake valve in each of the cylinders are opened, and the exhaust valve of the following cylinder in the cylinders which are successive in terms of exhaust order are opened during the overlap period in the other, preceding, cylinder. Therefore, the ejector effect is also exerted on the intake port of the preceding cylinder during the overlap period, so that it becomes possible to further promote scavenging in the preceding cylinder, and achieve a further improvement in volumetric efficiency ($\eta V$) and thus a further improvement in torque performance.

The above embodiment discloses that the obstacle member is provided in the exhaust duct line at a position immediately downstream of the merged portion.

According to this feature, the obstacle member is provided at a position having the smallest flow passage area. As the flow passage area becomes smaller, a speed of the exhaust gas jet flow becomes higher, and thereby the negative pressure becomes stronger, so that the self-excited vibration of the exhaust gas jet flow is more likely to occur. In this situation, according to this feature, the obstacle member can effectively suppress the self-excited vibration of the exhaust gas jet flow.

The above embodiment discloses that the obstacle member is an $O_2$ sensor.

According to this feature, the $O_2$ sensor is used to additionally serve as the obstacle member, so that it becomes to eliminate a need for providing a special member as the obstacle member to thereby achieve an reduction in the number of components. Further, in the case where the $O_2$ sensor is provided at a position having the smallest flow passage area (e.g., provided at a position immediately downstream of the merged portion of the mixing duct), so that it becomes possible to evenly detect an oxygen concentration of exhaust gas discharged from the respective cylinders. Thus, it becomes possible to accurately detect engine operating states, for example, to accurately control each of the cylinders during execution of AWS (Accelerated Warm-up System).

The above embodiment discloses that the obstacle member is provided at a position having the smallest flow passage area of the exhaust duct, wherein a/D is set in the range of 0.5 to 0.85, where a represents a diameter of a perfect circle having a same area as a flow passage area at a downstream end of each of the independent exhaust ducts, and D represents a diameter of a perfect circle having a same area as an area obtained by subtracting an area of an exhaust gas flow passage blocked by the obstacle member from the smallest flow passage area.

According to this feature, it becomes possible to provide a good balance between the ejector effect, and the effect of suppressing the self-excited vibration of the exhaust gas jet flow. If the ratio a/D is less than 0.5, an area obtained by subtracting an area of an exhaust gas flow passage blocked by the obstacle member from the smallest flow passage area becomes excessively large. This means that an area of an exhaust gas flow passage blocked by the obstacle member is excessively small, and therefore the effect of suppressing the self-excited vibration of the exhaust gas jet flow is liable to become insufficient. On the other hand, if the ratio a/D is greater than 0.85, an area obtained by subtracting an area of an exhaust gas flow passage blocked by the obstacle member from the smallest flow passage area becomes excessively small. This means that an area of an exhaust gas flow passage blocked by the obstacle member 59 is excessively large. Thus, an exhaust gas jet flow expelled from the downstream end of each of the independent exhaust ducts becomes stagnant, and thereby a negative pressure in the merged portion (in the mixing duct) is weakened, so that the ejector effect is liable to become insufficient.

(5) Modifications of Embodiment

The mixing duct 50 may consist only of the merged portion 56 having a flow passage area which decreases (devoid of the straight portion 57 and the diffuser portion 58), or may consist of the merged portion 56 and the diffuser portion 58 having a flow passage area which increases (devoid of the straight portion 57). The mixing duct configured as above may be used to obtain an ejector effect. For example, in the case where a length of the mixing duct 50 is reduced due to layout restrictions during design activities in a mass-production stage, the mixing duct may be formed, for example, as a type consisting only of the merged portion 56, or a type in which the merged portion 56 directly connects to the diffuser section 58 smoothly by a curved surface, while omitting the straight portion.

Figure 14:
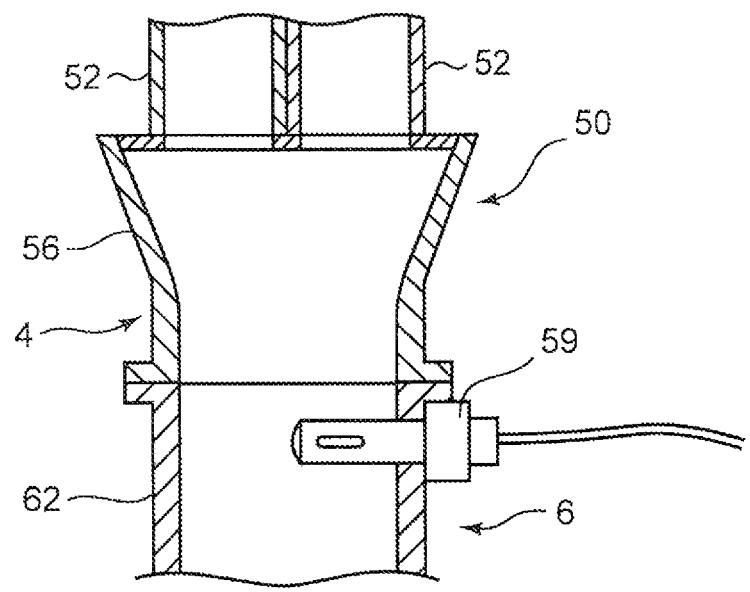
FIG. 14 is a longitudinal sectional view of an upstream tubular portion of a casing of a catalytic device, a mixing duct and its surrounding area in the case where an $O_2$ sensor is provided in the upstream tubular portion, i.e., an exhaust duct downstream of a merged portion of the mixing duct.

For example, as illustrated in FIG. 14, in the case of using the mixing duct 50 consisting only of the merged portion 56, it is preferable that the obstacle member (in the illustrated embodiment, the $O_2$ sensor) 59 is installed in the exhaust duct line 4 at a position immediately downstream of the mixing duct 50, i.e., immediately downstream of the merged portion 56. In FIG. 14, the obstacle member 59 is installed in the upstream duct portion of the casing 62 of the catalytic device 6 located downstream of the mixing duct 50.

This makes it possible to achieve a reduction in length of the mixing duct 50 in the exhaust gas flow direction, and thus achieve a reduction in length of the entire exhaust system in the exhaust gas flow direction. In addition, the obstacle member 59 is installed at a position having the smallest flow passage area (at a position immediately downstream of the merged portion 56). As the flow passage area becomes smaller, the speed of the exhaust gas jet flow becomes higher, and thereby the negative pressure becomes stronger, so that the self-excited vibration of the exhaust gas jet flow is more likely to occur. In this situation, according to this feature, the obstacle member 59 can effectively suppress the self-excited vibration of the exhaust gas jet flow.

As long as the obstacle member 59 is capable of partially blocking an exhaust flow passage, its configuration, such as a shape, a quantity, and an arrangement, is not particularly limited, but may be appropriately determined depending on situations. Examples of a usable shape include a rod-like shape, a plate-like shape and a net-like shape. Examples of a usable arrangement include a type configured to protrude into the exhaust gas flow passage, and a type configured to get across the exhaust gas flow passage. Further, a plurality of the obstacle members may be arranged side-by-side in the exhaust gas flow direction, or may be arranged to surround the exhaust gas flow passage. Further, the obstacle members 59 may also be disposed in a combination of these types of arrangements.

In addition to the $O_2$ sensor, examples of a sensor capable of being used to additionally serve the obstacle member 59 include an exhaust gas temperature sensor.

This application is based on Japanese Patent Application Serial No. 2011-248723 filed in Japan Patent Office on Nov. 14, 2011, the contents of which are hereby incorporated by reference.

While the invention of the present application has been described appropriately and fully by way of the embodiment as above with reference to the drawings in order to express the invention, it should be appreciated that a person skilled in the art can readily change and/or modify the embodiment described above. It is therefore understood that a changed embodiment or a modified embodiment implemented by a person skilled in the art is encompassed within the scope set forth in the appended claims unless the changed embodiment or the modified embodiment is of a level that deviates from the scope set forth in the appended claims.

INDUSTRIAL APPLICABILITY

The present invention has a wide industrial applicability, in the technical field of an exhaust apparatus for a multi-cylinder engine mountable on an automotive vehicle or the like.

The invention claimed is:

1. An exhaust apparatus for a multi-cylinder engine having a plurality of cylinders each provided with an intake port, an exhaust port, an intake valve capable of opening and closing the intake port, and an exhaust valve capable of opening and closing the exhaust port, the exhaust apparatus comprising:
   a plurality of independent exhaust ducts each having an upstream end connected to the exhaust port of one of the cylinders or the exhaust ports of two or more of the cylinders which are non-successive in terms of exhaust order; and
   a merged portion configured to allow exhaust gas passing through each of the independent exhaust ducts to flow thereinto and formed to be gradually reduced in diameter toward a downstream side in an exhaust gas flow direction,
   wherein:
   each of the independent exhaust ducts has a downstream portion formed such that a flow passage area thereof decreases toward the downstream side;
   the independent exhaust ducts are connected to an upstream end of the merged portion in such a manner that downstream ends thereof are bundled together; and
   the merged portion or a portion of an exhaust duct line downstream of the merged portion is provided with an obstacle member for partially blocking an exhaust gas flow passage to serve as a means to suppress self-excited vibration of an exhaust gas jet flow which is expelled from each of the independent exhaust ducts into the merged portion.

2. The exhaust apparatus as defined in claim 1, which comprises a valve driving device for driving the intake valve and the exhaust valve of each of the cylinders in such a manner that, at least in a low-speed and high-load engine operating range, a valve opening period of the exhaust valve and a valve opening period of the intake valve in each of the cylinders overlap each other for a given overlap period, and the exhaust valve of a following one of the cylinders which are successive in terms of exhaust order is opened during the overlap period in the other, preceding, cylinder.

3. The exhaust apparatus as defined in claim 2, wherein the obstacle member is provided in the exhaust duct line at a position immediately downstream of the merged portion.

4. The exhaust apparatus as defined in claim 3, wherein the obstacle member is an $O_2$ sensor.

5. The exhaust apparatus as defined in claim 4, which comprises a mixing duct having the merged portion, wherein the obstacle member is provided at a position where the mixing duct has a smallest flow passage area, and wherein a/D is set in the range of 0.5 to 0.85, where a represents a diameter of a perfect circle having a same area as a flow passage area at a downstream end of each of the independent exhaust ducts, and D represents a diameter of a perfect circle having a same area as an area obtained by subtracting an area of an exhaust gas flow passage blocked by the obstacle member from the smallest flow passage area.

6. The exhaust apparatus as defined in claim 3, which comprises a mixing duct having the merged portion, wherein the obstacle member is provided at a position where the mixing duct has a smallest flow passage area, and wherein a/D is set in the range of 0.5 to 0.85, where a represents a diameter of a perfect circle having a same area as a flow passage area at a downstream end of each of the independent exhaust ducts, and D represents a diameter of a perfect circle having a same area as an area obtained by subtracting an area of an exhaust gas flow passage blocked by the obstacle member from the smallest flow passage area.

7. The exhaust apparatus as defined in claim 2, wherein the obstacle member is an $O_2$ sensor.

8. The exhaust apparatus as defined in claim 7, which comprises a mixing duct having the merged portion, wherein the obstacle member is provided at a position where the mixing duct has a smallest flow passage area, and wherein a/D is set in the range of 0.5 to 0.85, where a represents a diameter of a perfect circle having a same area as a flow passage area at a downstream end of each of the independent exhaust ducts, and D represents a diameter of a perfect circle having a same area as an area obtained by subtracting an area of an exhaust gas flow passage blocked by the obstacle member from the smallest flow passage area.

9. The exhaust apparatus as defined in claim 2, which comprises a mixing duct having the merged portion, wherein the obstacle member is provided at a position where the mixing duct has a smallest flow passage area, and wherein a/D is set in the range of 0.5 to 0.85, where a represents a diameter of a perfect circle having a same area as a flow passage area at a downstream end of each of the independent exhaust ducts, and D represents a diameter of a perfect circle having a same area as an area obtained by subtracting an area of an exhaust gas flow passage blocked by the obstacle member from the smallest flow passage area.

10. The exhaust apparatus as defined in claim 1, wherein the obstacle member is provided in the exhaust duct line at a position immediately downstream of the merged portion.

11. The exhaust apparatus as defined in claim 10, wherein the obstacle member is an $O_2$ sensor.

12. The exhaust apparatus as defined in claim 11, which comprises a mixing duct having the merged portion, wherein the obstacle member is provided at a position where the mixing duct has a smallest flow passage area, and wherein a/D is set in the range of 0.5 to 0.85, where a represents a diameter of a perfect circle having a same area as a flow passage area at a downstream end of each of the independent exhaust ducts, and D represents a diameter of a perfect circle having a same area as an area obtained by subtracting an area of an exhaust gas flow passage blocked by the obstacle member from the smallest flow passage area.

13. The exhaust apparatus as defined in claim 10, which comprises a mixing duct having the merged portion, wherein the obstacle member is provided at a position where the mixing duct has a smallest flow passage area, and wherein a/D is set in the range of 0.5 to 0.85, where a represents a diameter of a perfect circle having a same area as a flow passage area at a downstream end of each of the independent exhaust ducts, and D represents a diameter of a perfect circle having a same area as an area obtained by subtracting an area of an exhaust gas flow passage blocked by the obstacle member from the smallest flow passage area.

14. The exhaust apparatus as defined in claim 1, wherein the obstacle member is an $O_2$ sensor.

15. The exhaust apparatus as defined in claim 14, which comprises a mixing duct having the merged portion, wherein the obstacle member is provided at a position where the mixing duct has a smallest flow passage area, and wherein a/D is set in the range of 0.5 to 0.85, where a represents a diameter of a perfect circle having a same area as a flow passage area at a downstream end of each of the independent exhaust ducts, and D represents a diameter of a perfect circle having a same area as an area obtained by subtracting an area of an exhaust gas flow passage blocked by the obstacle member from the smallest flow passage area.

16. The exhaust apparatus as defined in claim 1, which comprises a mixing duct having the merged portion, wherein the obstacle member is provided at a position where the mixing duct has a smallest flow passage area, and wherein a/D is set in the range of 0.5 to 0.85, where a represents a diameter of a perfect circle having a same area as a flow passage area at a downstream end of each of the independent exhaust ducts, and D represents a diameter of a perfect circle having a same area as an area obtained by subtracting an area of an exhaust gas flow passage blocked by the obstacle member from the smallest flow passage area.

\* \* \* \* \*